(12) United States Patent
Gopalakrishnan et al.

(10) Patent No.: US 10,187,403 B2
(45) Date of Patent: Jan. 22, 2019

(54) FALSE POSITIVE DETECTION REDUCTION SYSTEM FOR NETWORK-BASED ATTACKS

(71) Applicant: salesforce.com, inc., San Francisco, CA (US)

(72) Inventors: Amalkrishnan Chemmany Gopalakrishnan, San Francisco, CA (US); Angel Prado, San Francisco, CA (US); Sun Hwan Kim, San Francisco, CA (US); Omkar Ramesh Kulkarni, Fremont, CA (US); Harsimranjit Singh Chabbewal, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 255 days.

(21) Appl. No.: 14/957,490

(22) Filed: Dec. 2, 2015

(65) Prior Publication Data

US 2017/0163663 A1    Jun. 8, 2017

(51) Int. Cl.
*H04L 29/06* (2006.01)

(52) U.S. Cl.
CPC ................. *H04L 63/1416* (2013.01)

(58) Field of Classification Search
CPC ............. H04L 63/1416; H04L 63/1425; H04L 63/1441; G06F 21/554; G06F 21/552
USPC ........................................................... 726/23
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |

(Continued)

*Primary Examiner* — William S Powers
(74) *Attorney, Agent, or Firm* — Schwabe Williamson & Wyatt

(57) ABSTRACT

A system detects a security attack through a network-based application. The system receives a runtime request for invocation of a function and dynamically determines if the request for invocation of the function is associated with a cross-site scripting attack. In response to determine the function is associated with a cross-site scripting attack, the system stores information associated with the request, which is used for determining if the request is a legitimate request or a cross-site scripting attack.

20 Claims, 9 Drawing Sheets

(56) References Cited

U.S. PATENT DOCUMENTS

| | | |
|---|---|---|
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,544,086 B2 | 9/2013 | Field |
| 8,554,847 B2 | 10/2013 | Shue |
| 8,566,301 B2 | 10/2013 | Rueben et al. |
| 8,646,103 B2 | 2/2014 | Jakobson et al. |
| 8,839,401 B2 | 9/2014 | Starink |
| 8,955,138 B1* | 2/2015 | Mahadik ............... G06F 21/55 726/22 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0112161 A1* | 8/2002 | Thomas, III ............ G06F 21/10 713/176 |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 3/2005 | Brodersen et al. |
| 2007/0074169 A1* | 3/2007 | Chess .................... G06F 2/54 717/126 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |

(56) References Cited

U.S. PATENT DOCUMENTS

| | | |
|---|---|---|
| 2011/0247051 A1 | 10/2011 | Bulumulla |
| 2012/0042218 A1 | 2/2012 | Cinarkaya |
| 2012/0137367 A1* | 5/2012 | Dupont .................. G06F 21/00 726/25 |
| 2012/0151592 A1* | 6/2012 | Veanes .................... G06F 21/51 726/25 |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2013/0347115 A1* | 12/2013 | Field ...................... G06F 21/56 726/24 |
| 2014/0325657 A1* | 10/2014 | Bailey ................ H04L 63/1433 726/25 |
| 2014/0359537 A1 | 12/2014 | Jackobson et al. |
| 2016/0057167 A1 | 2/2016 | Bach |

* cited by examiner

FALSE POSITIVE DETECTION REDUCTION SYSTEM FOR NETWORK-BASED ATTACKS

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to identifying network security attacks, and, more specifically to identifying function calls directed to suspicious functions associated with cross-site scripting attacks and determining whether the function calls are legitimate based on information associated with the function calls.

BACKGROUND

"Cloud computing" services provide shared resources, software, and information to computers and other devices upon request or on demand. Cloud computing typically involves the over-the-Internet provision of dynamically-scalable and often virtualized resources. Technological details can be abstracted from end-users, who no longer have need for expertise in, or control over, the technology infrastructure "in the cloud" that supports them. In cloud computing environments, software applications can be accessible over the Internet rather than installed locally on personal or in-house computer systems. Some of the applications or on-demand services provided to end-users can include the ability for a user to create, view, modify, store and share documents and other files.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1A:
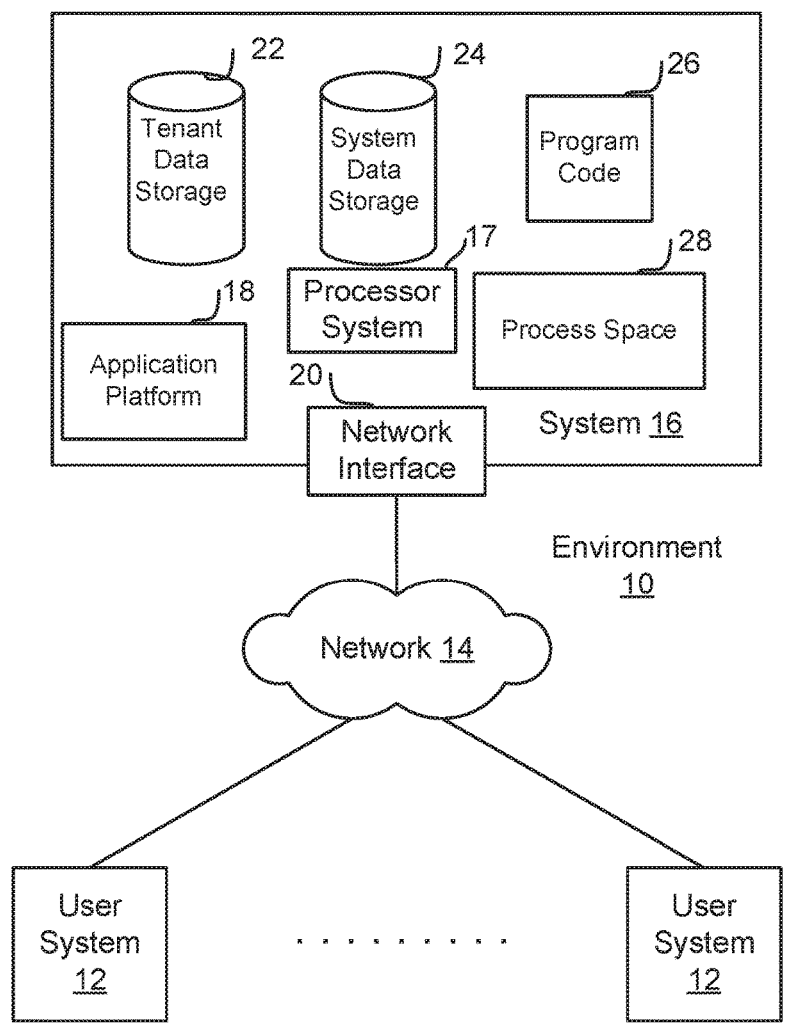
FIG. 1A shows a block diagram of an example environment in which an on-demand database service can be used according to some implementations.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for extracting information from headers, and, more specifically, for extracting custom information from a hypertext transfer protocol (http) header.

In response to a logged interaction of a user, a communication may be generated and transmitted across a network to a database system for storage and analysis. The communication may include auto-generated headers and event data associated with the logged interaction of the user. Often information additional to the auto-generated header and event data is desired to provide for a more in-depth analysis of the logged interaction of the user. However, adding desired information to a plurality of communications upon generation may be labor-intensive and time-consuming as the task involves writing code across a variety of different programming languages associated with the plurality of communications.

The database system may determine that a received communication includes a predetermined data pattern and custom information added subsequently to the generation of the communication. For example, the database system may receive a http message and parse a header section of the http message for the predetermined data pattern.

In response to determining that the received communication includes the predetermined data pattern, the database system may extract the custom information associated with the predetermined data pattern from the header section. The database system may store the extracted custom information along with event data included in the communication.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
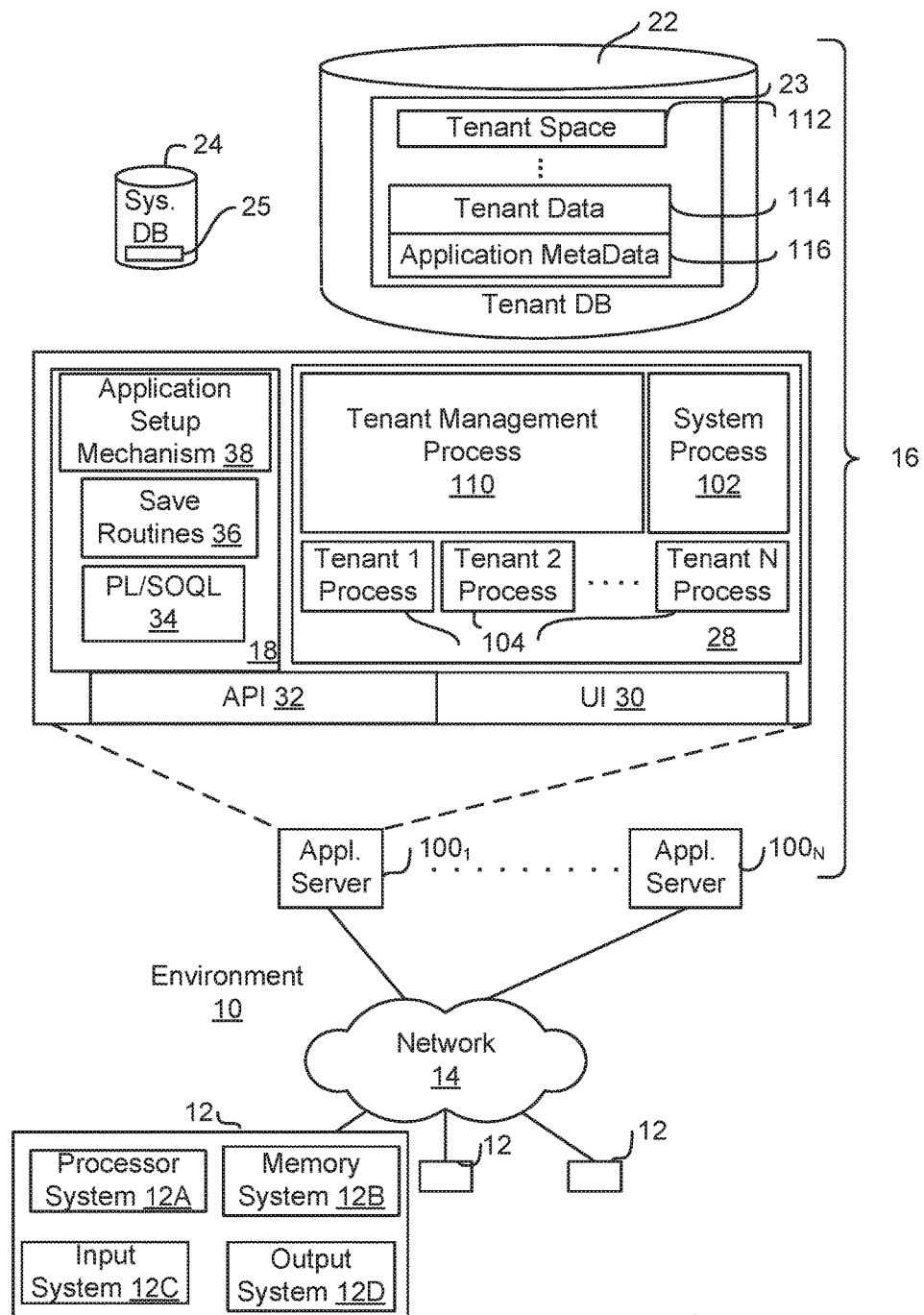
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers 1001-100N. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server 1001 can be coupled via the network 14 (for example, the Internet), another application server 100N-1 can be coupled via a direct network link, and another application server 100N can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
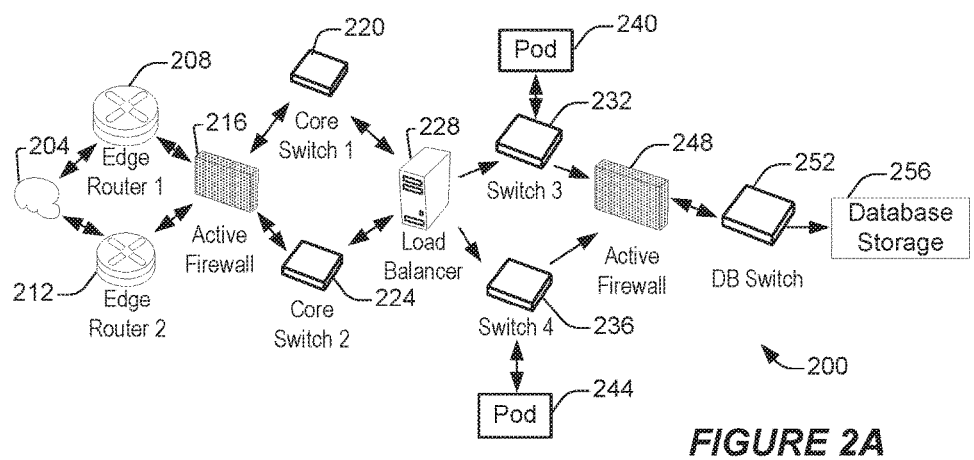
FIG. 2A shows a system diagram of example architectural components of an on-demand database service environment according to some implementations.

FIG. 2A shows a system diagram illustrating example architectural components of an on-demand database service environment 200 according to some implementations. A client machine communicably connected with the cloud 204, generally referring to one or more networks in combination, as described herein, can communicate with the on-demand database service environment 200 via one or more edge routers 208 and 212. A client machine can be any of the examples of user systems 12 described above. The edge routers can communicate with one or more core switches 220 and 224 through a firewall 216. The core switches can communicate with a load balancer 228, which can distribute server load over different pods, such as the pods 240 and 244. The pods 240 and 244, which can each include one or more servers or other computing resources, can perform data processing and other operations used to provide on-demand services. Communication with the pods can be conducted via pod switches 232 and 236. Components of the on-demand database service environment can communicate with database storage 256 through a database firewall 248 and a database switch 252.

Figure 2B:
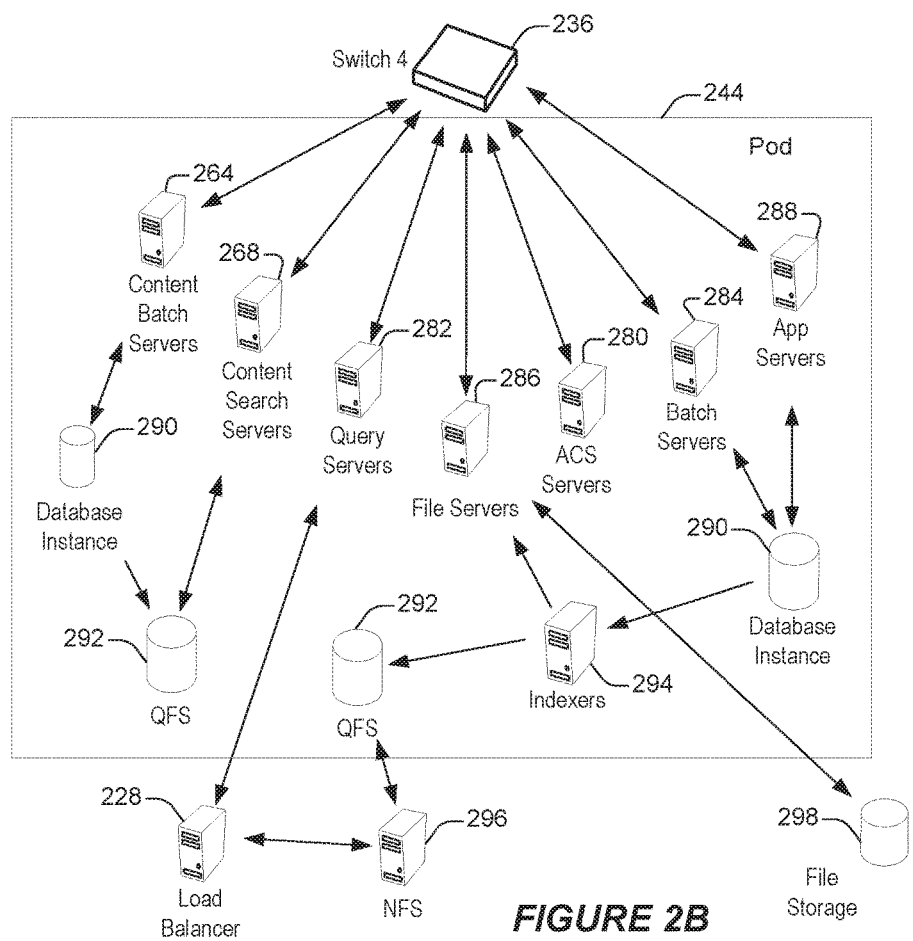
FIG. 2B shows a system diagram further illustrating example architectural components of an on-demand database service environment according to some implementations.

As shown in FIGS. 2A and 2B, accessing an on-demand database service environment can involve communications transmitted among a variety of different hardware or software components. Further, the on-demand database service environment 200 is a simplified representation of an actual on-demand database service environment. For example, while only one or two devices of each type are shown in FIGS. 2A and 2B, some implementations of an on-demand database service environment can include anywhere from one to several devices of each type. Also, the on-demand database service environment need not include each device shown in FIGS. 2A and 2B, or can include additional devices not shown in FIGS. 2A and 2B.

Additionally, it should be appreciated that one or more of the devices in the on-demand database service environment 200 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 204 is intended to refer to a data network or multiple data networks, often including the Internet. Client machines communicably connected with the cloud 204 can communicate with other components of the on-demand database service environment 200 to access services provided by the on-demand database service environment. For example, client machines can access the on-demand database service environment to retrieve, store, edit, or process information. In some implementations, the edge routers 208 and 212 route packets between the cloud 204 and other components of the on-demand database service environment 200. For example, the edge routers 208 and 212 can employ the Border Gateway Protocol (BGP). The BGP is the core routing protocol of the Internet. The edge routers 208 and 212 can maintain a table of IP networks or 'prefixes', which designate network reachability among autonomous systems on the Internet.

In some implementations, the firewall 216 can protect the inner components of the on-demand database service environment 200 from Internet traffic. The firewall 216 can block, permit, or deny access to the inner components of the on-demand database service environment 200 based upon a set of rules and other criteria. The firewall 216 can act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 can be configured as network bridges that quickly route data between different components within the on-demand database service environment. In some implementations, the use of two or more core switches 220 and 224 can provide redundancy or reduced latency.

In some implementations, the pods 240 and 244 perform the core data processing and service functions provided by the on-demand database service environment. Each pod can include various types of hardware or software computing resources. An example of the pod architecture is discussed in greater detail with reference to FIG. 2B. In some implementations, communication between the pods 240 and 244 is conducted via the pod switches 232 and 236. The pod switches 232 and 236 can facilitate communication between the pods 240 and 244 and client machines communicably connected with the cloud 204, for example via core switches 220 and 224. Also, the pod switches 232 and 236 may facilitate communication between the pods 240 and 244 and the database storage 256. In some implementations, the load balancer 228 can distribute workload between the pods 240 and 244. Balancing the on-demand service requests between the pods can assist in improving the use of resources, increasing throughput, reducing response times, or reducing overhead. The load balancer 228 may include multilayer switches to analyze and forward traffic.

In some implementations, access to the database storage 256 is guarded by a database firewall 248. The database firewall 248 can act as a computer application firewall operating at the database application layer of a protocol stack. The database firewall 248 can protect the database storage 256 from application attacks such as structure query language (SQL) injection, database rootkits, and unauthorized information disclosure. In some implementations, the database firewall 248 includes a host using one or more forms of reverse proxy services to proxy traffic before passing it to a gateway router. The database firewall 248 can inspect the contents of database traffic and block certain content or database requests. The database firewall 248 can work on the SQL application level atop the TCP/IP stack, managing applications' connection to the database or SQL management interfaces as well as intercepting and enforcing packets traveling to or from a database network or application interface.

In some implementations, communication with the database storage 256 is conducted via the database switch 252. The multi-tenant database storage 256 can include more than one hardware or software components for handling database queries. Accordingly, the database switch 252 can direct database queries transmitted by other components of the on-demand database service environment (for example, the pods 240 and 244) to the correct components within the database storage 256. In some implementations, the database storage 256 is an on-demand database system shared by many different organizations as described above with reference to FIGS. 1A and 1B.

FIG. 2B shows a system diagram further illustrating example architectural components of an on-demand database service environment according to some implementations. The pod 244 can be used to render services to a user of the on-demand database service environment 200. In some implementations, each pod includes a variety of servers or other systems. The pod 244 includes one or more content batch servers 264, content search servers 268, query servers 282, file force servers 286, access control system (ACS) servers 280, batch servers 284, and app servers 288. The pod 244 also can include database instances 290, quick file systems (QFS) 292, and indexers 294. In some implementations, some or all communication between the servers in the pod 244 can be transmitted via the switch 236.

In some implementations, the app servers 288 include a hardware or software framework dedicated to the execution of procedures (for example, programs, routines, scripts) for supporting the construction of applications provided by the on-demand database service environment 200 via the pod 244. In some implementations, the hardware or software framework of an app server 288 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods.

The content batch servers 264 can handle requests internal to the pod. Some such requests can be long-running or not tied to a particular customer. For example, the content batch servers 264 can handle requests related to log mining, cleanup work, and maintenance tasks. The content search servers 268 can provide query and indexer functions. For example, the functions provided by the content search servers 268 can allow users to search through content stored in the on-demand database service environment. The file force servers 286 can manage requests for information stored in the Fileforce storage 298. The Fileforce storage 298 can store information such as documents, images, and basic large objects (BLOBS). By managing requests for information using the file force servers 286, the image footprint on the database can be reduced. The query servers 282 can be used to retrieve information from one or more file systems. For example, the query system 282 can receive requests for information from the app servers 288 and transmit information queries to the NFS 296 located outside the pod.

The pod 244 can share a database instance 290 configured as a multi-tenant environment in which different organizations share access to the same database. Additionally, services rendered by the pod 244 may call upon various hardware or software resources. In some implementations, the ACS servers 280 control access to data, hardware resources, or software resources. In some implementations, the batch servers 284 process batch jobs, which are used to run tasks at specified times. For example, the batch servers 284 can transmit instructions to other servers, such as the app servers 288, to trigger the batch jobs.

In some implementations, the QFS 292 is an open source file system available from Sun Microsystems® of Santa Clara, Calif. The QFS can serve as a rapid-access file system for storing and accessing information available within the pod 244. The QFS 292 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 268 or indexers 294 to identify, retrieve, move, or update data stored in the network file systems 296 or other storage systems.

In some implementations, one or more query servers 282 communicate with the NFS 296 to retrieve or update information stored outside of the pod 244. The NFS 296 can allow servers located in the pod 244 to access information to access files over a network in a manner similar to how local storage is accessed. In some implementations, queries from the query servers 282 are transmitted to the NFS 296 via the load balancer 228, which can distribute resource requests over various resources available in the on-demand database service environment. The NFS 296 also can communicate with the QFS 292 to update the information stored on the NFS 296 or to provide information to the QFS 292 for use by servers located within the pod 244.

In some implementations, the pod includes one or more database instances 290. The database instance 290 can transmit information to the QFS 292. When information is transmitted to the QFS, it can be available for use by servers within the pod 244 without using an additional database call. In some implementations, database information is transmitted to the indexer 294. Indexer 294 can provide an index of information available in the database 290 or QFS 292. The index information can be provided to file force servers 286 or the QFS 292.

Figure 3A:
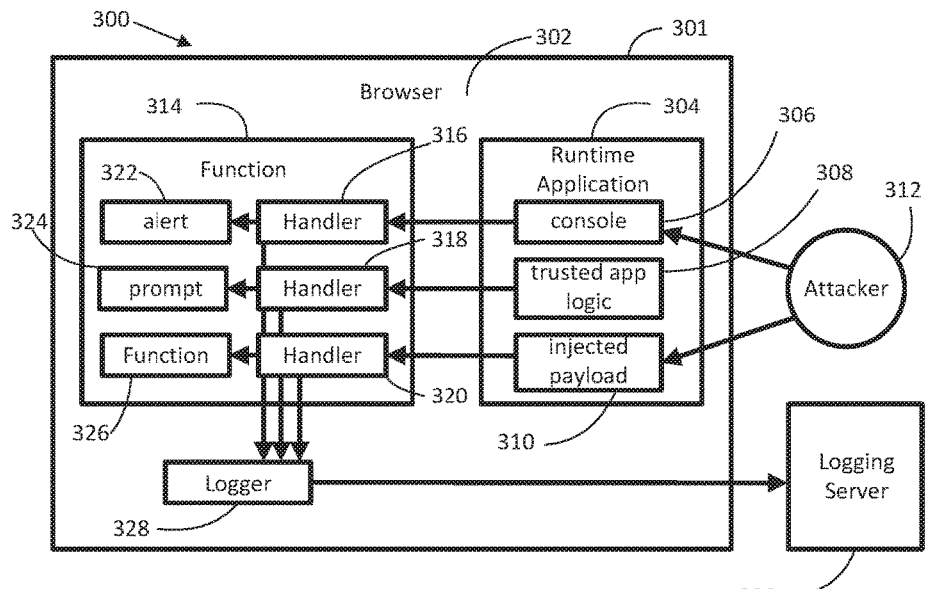
FIG. 3A shows a block diagram of an example environment in which a system identifies a predetermined function call and logs information associated with the predetermined function call.

FIG. 3A shows a block diagram of an example environment 300 in which a system 301 identifies a predetermined function call and logs information associated with the predetermined function call. The system 301 may comprise a computing device, a database system, a processing device, a server system, or any combination thereof.

The system 301 may be coupled to a network, such as network 14 (FIG. 1A). The system 301 may include a software interface, such as browser 302, allowing the system 301 to interact with the network. While a browser 302 is shown as providing interaction with the network, it is to be understood that the environment may include any hardware component or software application for interacting with the network, including an operating system operating on the system 301. Any reference to browser 302 should be understood to encompass one or more components or applications for interacting with the network.

A runtime application 304 may be executed within the browser 302. The runtime application 304 may allow a user of the system 301 to interact with the system 301, the network, or any combination thereof. Further, the runtime application 304 may issue requests to the network and receive data back from the network.

The runtime application 304 may have one or more interfaces, such as console 306, trusted application logic 308, and injected payload 310, that may generate function calls. The injected payload 310 is an interface that may be exposed due to a cross-site scripting (XSS) vulnerability. An attacker may add the injected payload 310 via an input field.

The interfaces may receive a request for invocation of a function from other applications on the system 301 and/or from the network and generate function calls in response to receiving the request. In some examples, the interfaces may receive a function call and output the function call with or without alteration.

The trusted application logic 308 may comprise any logic associated with trusted applications operating on the system 301, any logic that may be retrieved from the network by trusted applications running on the system 301, or both. The trusted applications may be defined by a user indicating that the application has acquired an elevated level of trust or may defined as having an elevated level of trust on installation of the application or by another application operating on the system 301. Trusted application logic 308 may limit what data is received from the network, may access data only from trusted locations on the network, may prevent any access to the trusted application logic 308 from the network, or any combination thereof. Accordingly, trusted application logic 308 generally is not a target for network-based security attacks.

The console 306 interface and the injected payload 310 interface may be targeted by network-based security attacks. The console 306 may allow the system. 301 to interact with the network and/or the network to interact with the system 301.

The injected payload 310 may allow code to be injected into a payload of code to be executed by the runtime application 304. The injected code may be in a programming language executable by the runtime application 304 and/or the browser 302, such as JavaScript, ActiveScript, Java, C, C++, HTML, or any combination thereof.

An attacker 312 may initiate a network-based attack on system 301, including a web-based attack. The attacker 312 may comprise a different system, a bot, a webpage, or any other device that may access or be accessed by the system 301 across the network. The attacker 312 may initiate the network-based attack by transmitting the attack to the system 301, by responding to a request from the system 301, or any combination thereof.

The attack may include injecting code into a payload to be executed by the runtime application 304 or the browser 302, transmitting a runtime request for invocation of a function call to the system 301, transmitting a function call to the system 301, or any combination thereof in some examples, the attack may involve the use of XSS, where the user may inject script into a web page. The system 301 may receive the injected script associated with the XSS in response to the system 301 accessing a web page containing the XSS.

The console 306, trusted app logic 308, and/or the injected payload 310 may output a function call to a function operator 314. The function call may be intercepted prior to invocation of the associated function by a handler, such as handlers 316, 318, 320, associated with the console 306, trusted app logic 308, or the injected payload 310, respectively.

The handlers may be associated with a certain function. For example, handler 316 may be associated with an alert function 322, handler 318 may be associated with a prompt function 324, and handler 320 may be associated with another function 326. Each function accessible by the runtime application 304 may have an associated handler. In some examples, the handlers may be limited to suspicious functions that are often subject to network-based attacks, may be limited to functions indicated by an application, operating system, or user as a handler should be associated with the function, or any combination thereof. In these examples where the handlers are associated with a single function, the handlers may extract information from the function call, the request for the function call, the injected script, or any combination thereof, and transmit the information to logger 328.

In some examples, the handlers 316, 318, 320, may be associated with multiple functions or may be able to transmit a function call to any of the functions executable by the system 301. In these examples, the handlers may contain a list of suspicious functions associated with network-based attacks, may access a list of suspicious functions associated with network-based attacks, may contain or access a list of functions to which information associated with the function call is desired to be extracted, or any combination thereof. The handlers may compare the function call to the list of functions to determine whether the function call is directed to one of the functions in the list and determine that information associated with the function call should be extracted in response to determining whether the function call is directed to one of the functions in the list.

The list of suspicious functions and/or the list of functions may be generated by a user, by an application, by an operating system, by a network communication sent to the system 301, or any combination thereof. The lists may be updated as new applications are installed on the system 301, new updates for applications residing on the system 301 are installed, new hardware is installed in or connected to the system 301, or any combination thereof. Further, the lists may be updated in response to determining that additional functions are or are becoming targets of network-based attacks.

Network-based XSS attacks often involve invoking functions that result in a change to the system 301, display of the system 301, or applications that an attacker can detect, whether or not the function causes harm to the system 301. By detecting that the change has occurred, the attacker confirms that be can control at least a portion of the system 301. Accordingly, the list of suspicious functions and/or the list of functions may be configured to include functions invoking changes that the attacker can detect.

The list of suspicious functions may include functions that produce visual changes to a display device of the system 301, functions that are Idempotent, functions that are dehuggable, or any combination thereof. The functions may include functions that can be invoked without affecting the document object model of the system 301 and functions that produce an entry in a log that an attacker can later access to determine whether the entry has been made to the log. A non-expansive list of functions that may be included in the lists of functions includes the alert function, the prompt function, the confirm function, the console.log function, and the window.print( ) function. It is to be understood that any function that may be executed by the system 301 may be included in the list and the functions are not limited to functions associated with XSS attacks.

The handlers may transmit the extracted information associated with the function call to logger 328. The extracted information may be transmitted in response to receiving the function call in the examples where the handlers 316, 318, 320 are associated with a certain function where the information is desired to be captured or may be transmitted in response to determining the information should be captured in the examples where the handler performs a comparison of the function call and the list of functions.

In response to the logger 328 receiving the information from the handlers 316, 318, 320, the logger 328 may convert the information into a format for storage. Conversion of the information may comprise converting the information into a different programming language, converting the information into a different storage element, condensing the information for storage, or any combination thereof. The logger 328 may further add identifying data to the received information, including time stamps, an indication of which handler 316, 318, 320 generated the information, an indication of which runtime application 304 generated the function call, an indication of which function the function call was directed to, or any combination thereof. Further, in some examples, the logger 328 may be configured to capture a screen shot associated with the function call.

The logger 328 may transmit the converted information to the logging server 330 for storage. The information stored in the logging server 330 may later be accessed to determine whether the function call was a network-based attack or an authorized function call. The information may be organized by any features included in the stored information, including the time stamp, the indication of which handler generated the information, the indication of which runtime application generated the function call, the indication of which function the function call was directed to, or any combination thereof. The information may be searched and displayed based any one or more of the features included in the information.

Figure 3B:
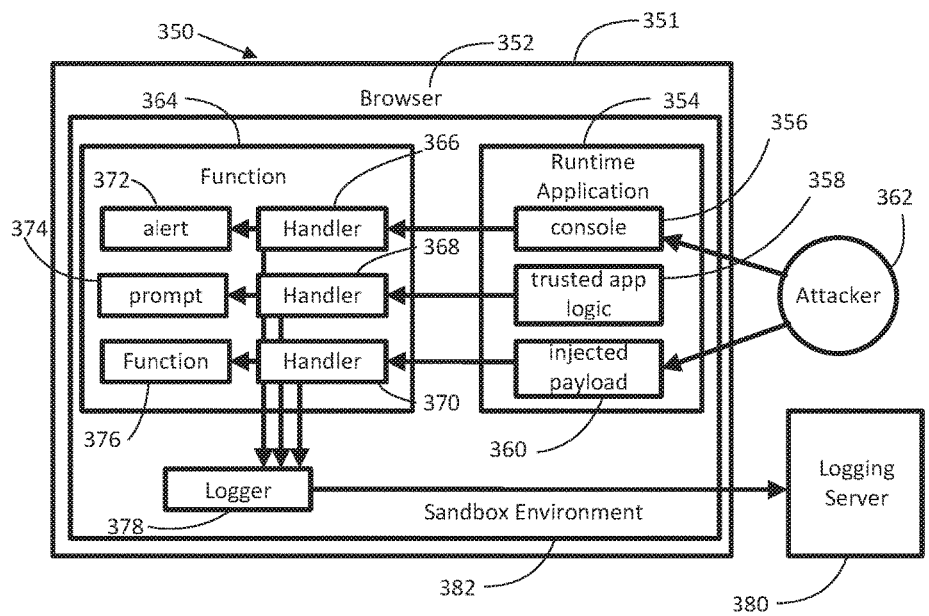
FIG. 3B shows a block diagram of a second example environment in which a system identifies a predetermined function call and logs information associated with the predetermined function call.

FIG. 3B shows a block diagram of a second example environment 350 in which a system 351 identifies a predetermined function call and logs information associated with the predetermined function call. The system 351 utilizes a sandbox environment 382 in which the runtime application 354, the function operator 364, the logger 378, or any combination thereof, may operate.

The sandbox environment 382 may operate to isolate the applications executing within the sandbox environment 382 from other components or operations of the system 351 not executing within the sandbox environment 382. In some examples, the sandbox environment 382 may limit access of the applications executing within the sandbox environment 382 to certain components or operations utilized by normal operations of the applications and prevent use of other components or operations not utilized by the applications in normal operation.

The sandbox environment 382 may be generated by the system 351, the browser 352, an application executing on the system 351, an operating system executing on the system 351, or any combination thereof. Some examples of sandbox environment 382 include Sandboxie™, HTML5's sandbox attribute for use with iframes, seccomp, SELinux, Apparmor, virtual machine emulators, or any combination thereof.

The browser 352, runtime application 354, function operator 364, logger 378, and logging server 380 may include similar features to the browser 302, runtime application 304, function operator 314, logger 328, and logging server 330 (FIG. 3A), respectively, as disclosed above. It is to be understood that while the browser 352, runtime application 354, function operator 364, logger 378, and logging server 380 may perform the same functions and operations as disclosed above, one or more of the functions or operations may be performed within the sandbox environment 382.

Figure 4:
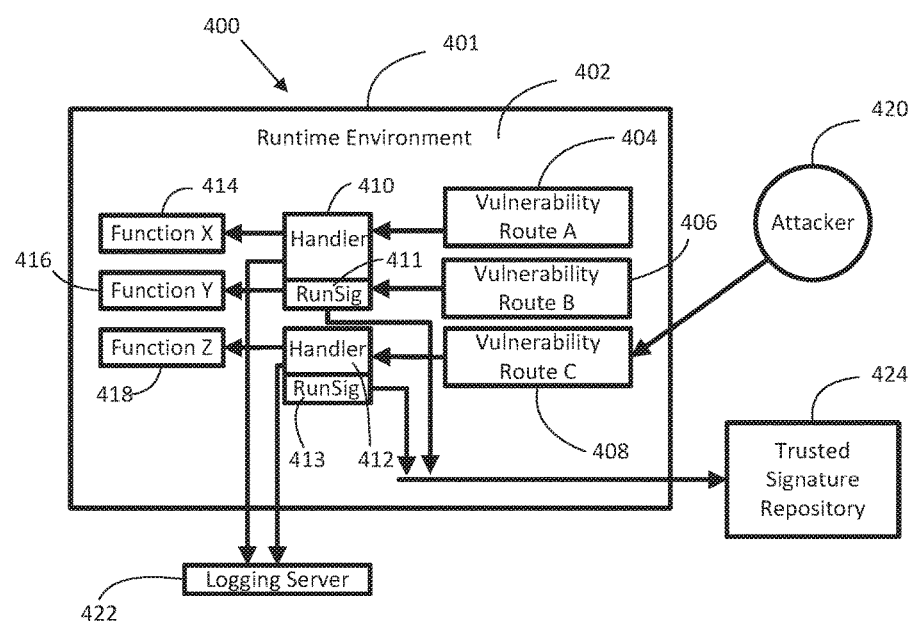
FIG. 4 shows a block diagram of an example environment in which a system determines if a function call directed to a function is a legitimate function call.

FIG. 4 shows a block diagram of an example environment 400 in which a system 401 determines if a function call directed to a function is a legitimate function call. The system 401 may execute a runtime environment 402 for executing functions. The runtime environment 402 may operate within a sandbox environment, such as the sandbox environment 382, any of the components within the runtime environment 402 may operate within the sandbox environment, or the runtime environment 402 may not run within or include a sandbox environment.

The system 401 may be coupled to a network, including any of the types of networks disclosed throughout this disclosure. The runtime environment 402 may have one or more vulnerability routes, such as vulnerability route A 404, vulnerability route B 406, and vulnerability route C 408, where an attack can be initiated on the system 401 from the network. The vulnerability routes may receive one or more function calls, runtime requests for invocation of a function call, scripts to be injected into code, or any combination thereof. In some examples, the function call, request, and/or script may be associated with an attack, such as an XSS attack, initiated by an attacker 420.

In response to receiving the requests, function calls, and/or scripts, the vulnerability routes may either generate a function call and transmit the function call to a handler, such as handler 410 and handler 412, or may transmit the received function call along to the handler. The handler may be configured to intercept any of the function calls, or portions thereof being transmitted from the vulnerability routes.

Each of the handlers may be associated with one or more functions, such as Function X 414, Function Y 416, and Function Z 418. The handlers may be associated with a function for which extraction and/or storage of information associated with a function call directed to the function is desired. In some examples, the handlers may be limited to associations with suspicious functions associated with network-based attacks on the system 401.

In some examples, the handlers may be configured to determine whether a function call received from one of the vulnerability routes is directed to a function for which extraction and/or storage of information associated with the function call is desired. The functions for which extraction and/or storage of information is desired may include any suspicious functions associated with network-based attacks.

In response to the handlers 410, 412 determining that the function call is directed to a function for which extraction and/or storage of information is desired, the handler may extract information from the function call and/or information associated with the function call. The extracted information may include data associated with a stack trace, variable values, values of cookies or other persistent storage mechanisms, or any combination thereof. The extracted information may include state information at the time the function call, request for invocation of the function call and/or injected script was received, or at a set period of time after the reception.

In some examples, the handlers 410, 412 may add additional identifying information to the extracted information, such as time stamps, an indication of which handler generated the information, an indication of which runtime application generated the function call, an indication of which function the function call was directed to, or any combination thereof.

Each handler may include a runtime signature generation component, such as runtime signature generation component 411 and runtime signature generation component 413. The handler may transmit the extracted information and/or the additional identifying information to the runtime signature generation component corresponding to the handler.

The runtime signature generation component 411 may utilize the extracted information and/or the additional identifying information to generate a runtime signature. The runtime signature may include one or more attributes included in the extracted information and/or the additional identifying information. The runtime signature may include information identifying the function to which the function call is directed and the source of the function call, request for invocation of the function call, the injected script, or any combination thereof.

In some examples, the runtime signature generation component 411 may perform a hash operation on the extracted information and/or the additional identifying information to generate the runtime signature. The hash operation may output a value based on the extracted information and/or the additional identifying information. The hash operation may include performing a SHA256 and/or a MD5 hash operation on the extracted information and/or the additional identifying information.

The runtime signature generation component 411 may compare, or transmit for comparison, the generated runtime signature to a list of trusted signatures stored in a trusted signature repository 424. The trusted signature repository 424 may be located on the system 401, on a server separate from the system 401, or on both. The trusted signature repository 424 may include a list of trusted signatures that may be authorized to invoke a function call for the suspicious function and/or the function for which the information has been extracted.

In some examples, the trusted signature repository 424 may have multiple lists of trusted signatures. Each list of trusted signatures may be associated with one or more specific functions. The lists of trusted signatures may contain different signatures as different signatures may be authorized to initiate function calls to different functions. The generated runtime signature may be compared to one of the lists of trusted signatures associated with the function to which the function call associated with the runtime signature is directed. For example, a runtime signature associated with a function call directed to the alert function may be compared to a list of trusted signatures associated with the alert function, while a runtime signature associated with a function call directed to the prompt function may be compared to a different list of trusted signatures associated with the prompt function.

If the generated runtime signature matches one of the trusted signatures in the trusted signature repository 424 associated with the function to which the function call associated with the runtime signature is directed, the environment 400 may determine that the function call is authorized. In response to determining that the generated runtime signature matches one of the signatures in the trusted signature repository 424, the handler may be configured to transmit a function call to a function invocation module, such as function X module 414, function Y module 416, and function Z module 418. However, if it is determined that the generated runtime signature does not match one of the signatures in the trusted signature repository 424, the extracted information and/or the additional identification information may be transmitted to logging server 422 for storage and review.

Figure 5:
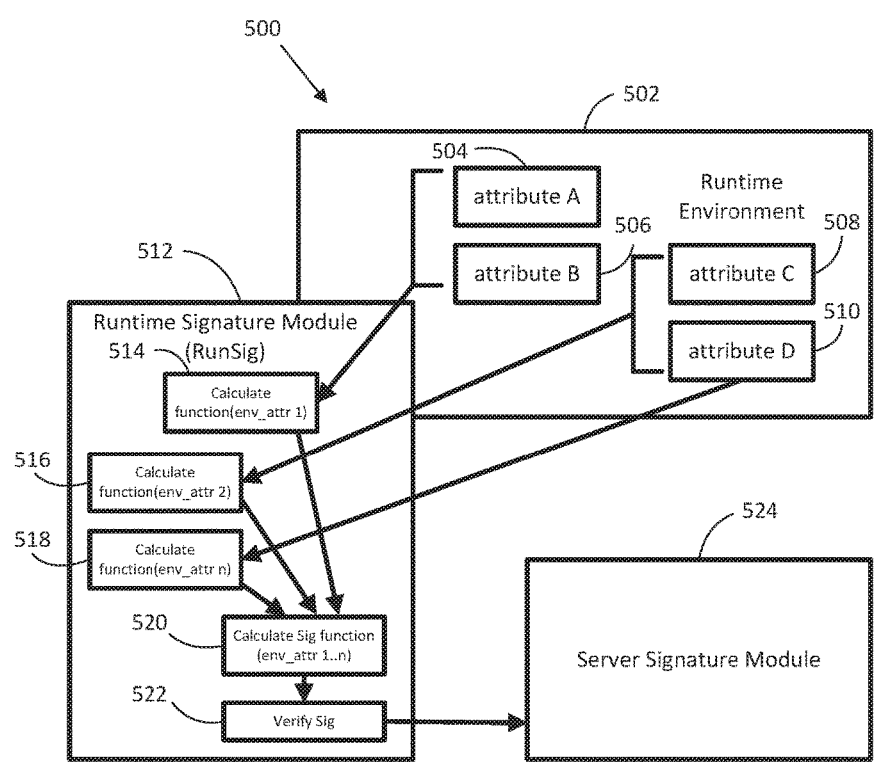
FIG. 5 shows a block diagram of an example module for generating runtime signatures.

FIG. 5 shows a block diagram of an example module 500 for generating runtime signatures. The module 500 may be included in the handler 410, the handler 412, the runtime signature generation component 411, and/or the runtime signature generation component 413 (FIG. 4) and may be invoked in response to determining that a function call is directed to one of the functions for which information is desired to be extracted or to one of the suspicious functions.

In response to determining that a function call is directed to one of the functions for which extraction of information should be performed, the module 500 may extract attributes, such as attribute A 504, attribute B 506, attribute C 508, and attribute D 510, from information associated with the function call. The extraction of the attributes may occur in a runtime environment, such as runtime environment 502, or any of the other runtime environments disclosed throughout this disclosure.

The extracted attributes may be extracted by runtime signature module 512. The runtime signature module 512 may be included in the runtime signature generation component 411, and/or the runtime signature generation component 413 (FIG. 4).

In response to receiving the attributes, the runtime signature module 512 may perform a function calculation, such as function calculation 514, function calculation 516, and function calculation 518, with the received attributes. The runtime signature module 512 may one or more function calculations with the received attributes. Each of the function calculations may be performed on a single attribute from the received attributes or on a plurality of attributes from the received attributes.

In some examples, the outputs of the function calculations may further be utilized by a runtime signature function calculation 520. In other examples, the extracted attributes may be directly input into the runtime signature function calculation 520. The runtime signature function calculation 520 may take as input the attributes and/or the outputs of the function calculations and generate a signature based on the inputs.

Any of the runtime signature function calculation 520, the function calculation 514, the function calculation 516, the function calculation 518, or any combination thereof, may perform a hash operation on the attributes and/or the outputs of other function calculations. The hash operations may include any of the hash operations disclosed throughout this disclosure. In some examples, the function calculations and/or the runtime signature function calculation 520 may perform other functions with respect to the attributes, such as combining the attributes, organizing the attributes, converting the attributes into a certain storage format, or any combination thereof.

The resultant runtime signature output from the runtime signature calculation function 520 may be transmitted to a signature verification function 522. The signature verification function 522 may verify the format of the runtime signature. In some examples, the signature verification function 522 may verify that there are no errors within the runtime signature.

Once the signature verification function 522 has completed signature verification of the runtime signature, the runtime signature may be transmitted to a server signature module 524 for storage. The server signature module 524 may be included in a logging server, such as logging server 330 (FIG. 3A), logging server 380 (FIG. 3B), and logging server 422 (FIG. 4). The runtime signature may be stored in certain locations of the server signature module 524 based on the value of the runtime signature, a function to which a function call associated with the runtime signature is directed, a time that the runtime signature was generated, the system on which the function call associated with the runtime signature was being executed, or any combination thereof.

Figure 6:
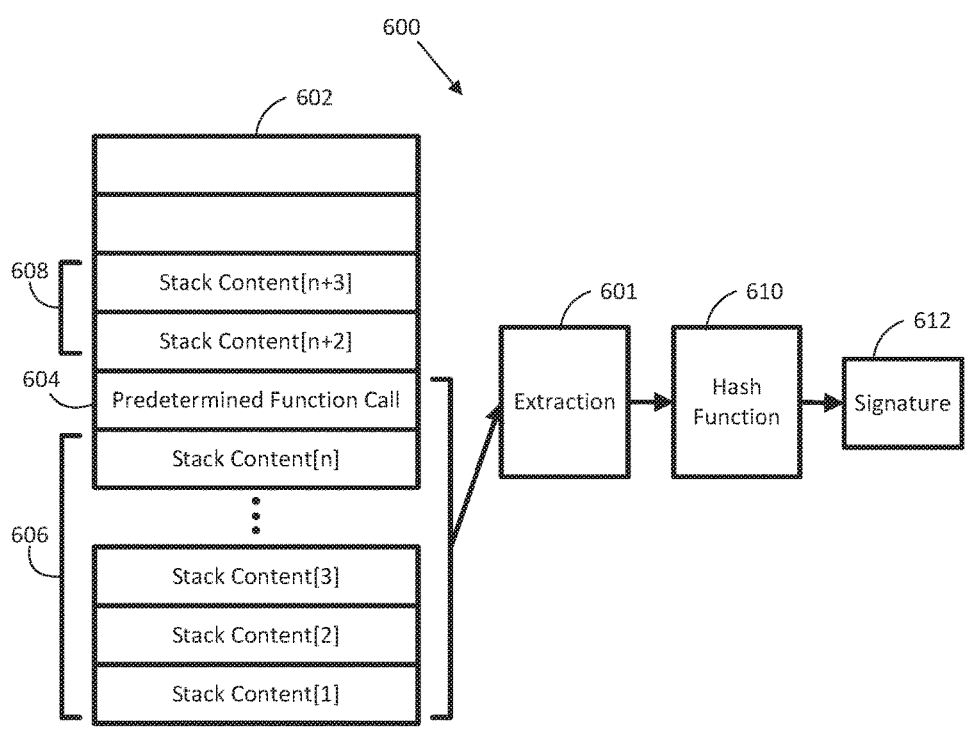
FIG. 6 shows a diagram of an example method of generating a runtime signature.

FIG. 6 shows a diagram of an example method 600 of generating a runtime signature. The method 600 may begin by extracting 601 values from a memory stack 602 associated with a function call directed to predetermined function call 604, which may include a function call to a suspicious function or a function for which information associated with the function call should be captured as disclosed throughout this disclosure. In some examples, the memory stack 602 may be associated with a runtime request for invocation of the predetermined function associated with the predetermined function call 604.

In response to determining that a function call directed to the predetermined function 604 has been invoked, a portion of the values included in the memory stack 602 may be copied or extracted 601 and transmitted to a hash function operation 610. The portion of the values may include stack values occurring prior to the predetermined function call 606, stack values occurring after the predetermined function call 606, a stack value associated with the predetermined function call 604, or any combination thereof. The stack values may include indications of functions performed prior to and/or after the predetermined function call 604. In some examples, irrelevant but differentiating information, such as domain names, may be removed from the copied or extracted values of the memory stack 602 prior to transmitting the values to the hash function operation 610.

In some examples, a length of the memory stack 602 may be transmitted to the hash function operation 610. The length of the memory stack 602 may be equal to the number of non-null values within the memory stack 602. In some further examples, a number of stack values occurring prior to the predetermined function call 606, a number of stack values occurring after the predetermined function call 608, or any combination thereof, may be transmitted to the hash function operation 610. The number of stack values may include the non-null values within the memory stack 602. Further, the number of stack values may include the predetermined function call 604.

The hash function operation 610 may perform a hash operation on any of the values or lengths passed from the memory stack 602. The hash function operation 610 may include any of the hash operations disclosed throughout this disclosure. The hash function operation 610 may output a runtime signature 612. In some examples, the hash function operation 610 may output a value or string of values that is converted into a runtime signature, such as by the server signature module 524 (FIG. 5). The resultant runtime signature may be compared to trusted signatures within a trusted signature repository, such as the trusted signature repository 424 (FIG. 4), to determine if the predetermined function call 604 is legitimate.

Figure 7:
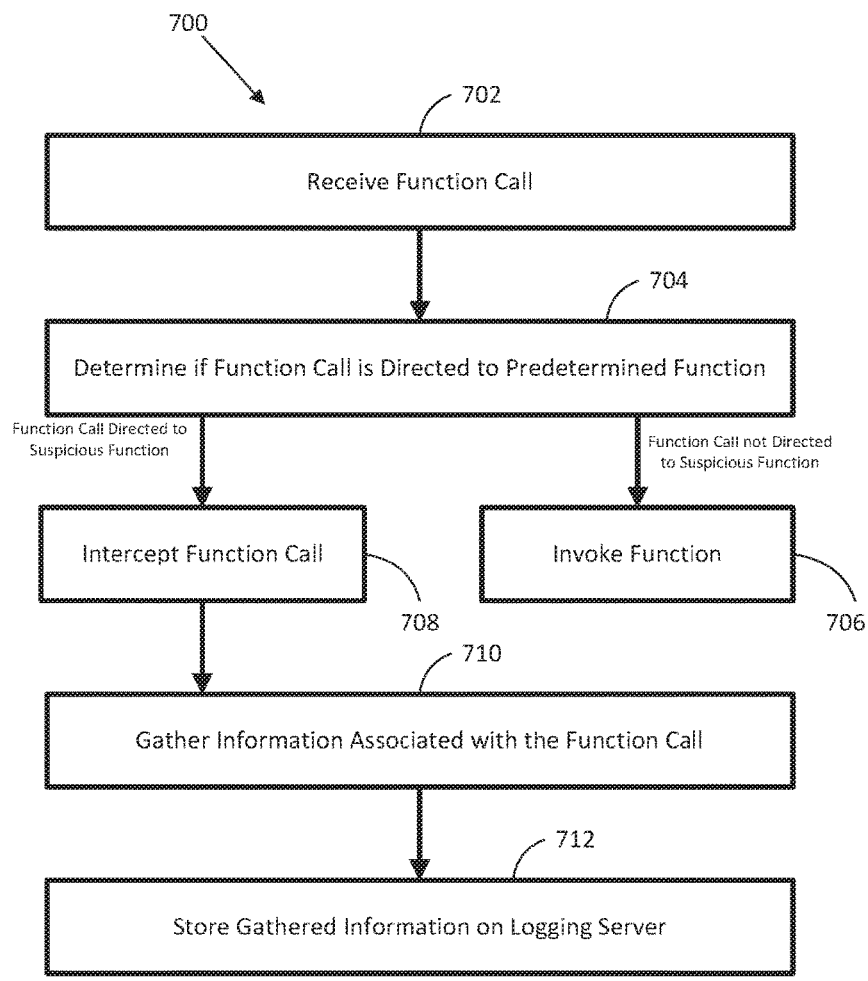
FIG. 7 shows an example process of identifying a function call directed to a predetermined function and storing information associated with the function call.

FIG. 7 shows an example process 700 of identifying a function call directed to a predetermined function and storing information associated with the function call. The method begins with step 702 by receiving a function call. The function call may be received in accordance with any of the descriptions of receiving a function call as described throughout this disclosure. The function call may be received from a network coupled to a system and may comprise a network-based attack on the system. The function may be received by any runtime application, such as runtime application 304 (FIG. 3A) and runtime application 354 (FIG. 3B), any vulnerability route, such as vulnerability route A 404, vulnerability route B 406, and vulnerability route C 408 (FIG. 4), or any combination thereof.

In step 704, the system determines if the function call is directed to a predetermined function, including any predetermined functions, suspicious functions, or functions desired to have corresponding information captured, as disclosed throughout this disclosure. The process of determining if the function call is directed to the predetermined function may be performed by any of the handlers described throughout this disclosure and by any of the methods of determining whether the function call is directed to a predetermined function as described throughout this disclosure.

In response to determining that the function call is not directed to the predetermined function, the process 700 may continue to step 706 where the function to which the function call is directed is invoked.

In response to determining that the function call is directed to the predetermined function, the function call is intercepted in step 708. Interception of the function call may be performed by any of the handlers described throughout this disclosure. Further, interception of the function call may prevent the function associated with the function call from being invoked.

From step 708, the process 700 continues to step 710, where information associated with the function call is gathered. The information associated with the function call may be gathered by any of the loggers, the handlers, the runtime signature generation components, runtime signature modules, or any combination thereof, described throughout this disclosure. Further, the information may include any of the information associated with a function call that is gathered as described throughout this disclosure.

In step 712, the gathered information is stored in a logging server. The logging server may include logging server 330 (FIG. 3A), logging server 380 (FIG. 3B), logging server 422 (FIG. 4), or any combination thereof. The stored information may later be accessed to determine if the function call is legitimate.

Figure 8:
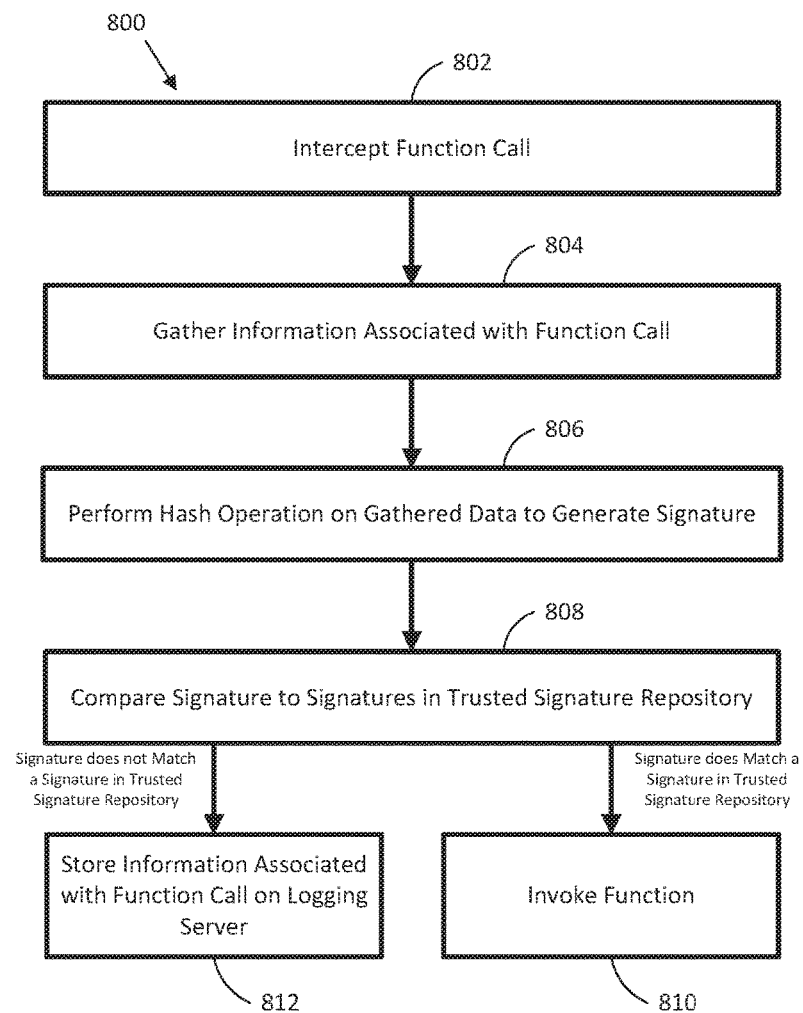
FIG. 8 shows an example process of determining whether a function call to a predetermined function is legitimate.

FIG. 8 shows an example process 800 of determining whether a function call directed to a predetermined function is legitimate. Process 800 may begin with step 802 by intercepting a function call directed to a predetermined function. Step 802 may be similar to step 708 (FIG. 7) in that step 802 is preceded by a system receiving a function call, such as step 702 (FIG. 7), and the system determining that the function is directed to a predetermined function, such as step 704 (FIG. 7). In step 802, the function call may be intercepted by any of the handlers described throughout this disclosure.

In step 804, information associated with the function call is gathered. The information associated with the function call may be gathered by any of the loggers, the handlers, the runtime signature generation components, the runtime signature modules, or any combination thereof, described throughout this disclosure. Further, the information may include any of the information associated with a function call that is gathered as described throughout this disclosure.

In step 806, a hash operation is performed on the gathered information. The hash operation may be performed by any runtime signature generation components, the runtime signature modules, or any combination thereof described throughout this disclosure and in accordance with any of the hash operations disclosed throughout this disclosure. The hash operation may produce a runtime signature associated with the function call.

In step 808, the runtime signature is compared with a list of signatures stored in a trusted signature repository, such as trusted signature repository 424 (FIG. 4). The comparison may be performed by any of the handlers, the runtime signature generation components, the trusted signature repositories, the server signature modules, or any combination thereof disclosed throughout this disclosure. Further, the comparison may be performed in accordance with any of the processes of comparing a runtime signature with a list of signatures stored in a trusted signature repository described throughout this disclosure.

If the runtime signature matches one of the signatures in the trusted signature repository, the process continues to step 810 where the function associated with the function call is invoked.

If the runtime signature does not match any of the signatures in the trusted signature repository, the process continues to step 812 where the information associated with the function call is stored on a logging server. The logging server may include 422 (FIG. 4).

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network.

A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A method of detecting a security attack through a network-based application, comprising:
   receiving, by a processing device, a runtime request for invocation of a function;
   determining, by the processing device, whether the function is included in a stored list of functions that are associated with a network attack;
   intercepting, by the processing device, the runtime request prior to the invocation of the function and in response to determining that the function is included in the stored list of functions;
   storing, by the processing device, information associated with the runtime request in response to determining that the function is included in the list of functions;
   performing, by the processing device, a hash operation on the runtime request in response to determining that the function is included in the list of functions, wherein performing the hash operation comprises:
      extracting, by the processing device, values from a memory stack associated with the runtime request; and
      performing, by the processing device, the hash operation on the extracted values; and
   determining, by the processing device, whether the runtime request is a legitimate request prior to the invocation of the function and based on a resultant output value of the hash operation.

2. The method of claim 1, wherein the list of functions comprises functions that exhibit one or more of the characteristics of being document object model idempotent, being debuggable or resulting in visual changes in response to execution of the functions.

3. The method of claim 1, further comprising:
   extracting, by the processing device, a runtime signature from the runtime request in response to determining that the function is included in the list of functions; and
   determining, by the processing device, whether the runtime request is a legitimate request based on the extracted runtime signature.

4. The method of claim 3, wherein determining whether the runtime request is a legitimate request comprises comparing, by the processing device, the extracted runtime signature to a stored list of trusted signatures.

5. The method of claim 1, further comprising invoking the function in response to determining that the runtime request is the legitimate request based on the resultant output value of the hash operation.

6. The method of claim 1, wherein performing the hash operation produces a signature associated with the runtime request, wherein the method further comprises:
   comparing, by the processing device, the signature to a plurality of trusted signatures stored in a trusted signature repository; and
   determining whether the signature matches a trusted signature of the plurality of trusted signatures based on the comparison, wherein determining whether the runtime request is a legitimate request includes determining, by the processing device, that the runtime request is the legitimate request in response to determining that the signature matches the trusted signature.

7. An apparatus, comprising:
   a processing device; and
   a memory device coupled to the processing device, the memory device having instructions stored thereon that, in response to execution by the processing device, cause the processing device to perform operations comprising:
      receiving a runtime request for invocation of a function;
      determining whether the function is a predetermined function associated with a cross-site scripting attack;
      storing information associated with the runtime request in response to determining that the function is the predetermined function;
      intercepting the runtime request prior to the invocation of the function and in response to determining that the function is the predetermined function; and
      determining whether the runtime request is legitimate prior to the invocation of the function.

8. The apparatus of claim 7, wherein the apparatus further comprises a display device, and wherein execution of the predetermined function results in a visual change of a display on the display device.

9. The apparatus of claim 7, wherein the operations further comprise:
   extracting elements from a memory stack in response to determining the function is the predetermined function;
   performing a hash operation with the elements; and
   comparing a resultant value from the hash operation to trusted values for determining whether the runtime request is legitimate.

10. The apparatus of claim 9, wherein the operations further comprise removing domain names from the elements, and wherein the hash operation is performed on the elements with the domain names removed.

11. The apparatus of claim 7, wherein the operations further comprise:
   generating a runtime signature based on the information associated with the runtime request; and
   comparing the runtime signature to one or more trusted signatures to determine whether the runtime request is legitimate.

12. The apparatus of claim 7, wherein the operations further comprise determining whether the runtime request is legitimate based on a stack length associated with the function.

13. The apparatus of claim 7, wherein the operations further comprise determining whether the runtime request is legitimate based on one or more functions performed precedent to receiving the runtime request.

14. A computer program stored on a non-transitory tangible medium for a database system, the computer program comprising a set of instructions operable to:
   receive, by the database system, a function call;
   dynamically determine, by the database system, whether the function call is directed to a function associated with a cross-site scripting attack;
   store, by the database system, identification information associated with the function call in response to determining the function call is directed to the function;

intercept, by the database system, the function call prior to invocation of the function and in response to determination that the function call is directed to the function; and determine, by the database system, whether the function call is legitimate prior to invocation of the function.

15. The computer program of claim 14, wherein invocation of the function adds a value to an accessible log.

16. The computer program of claim 14, wherein the function is idempotent.

17. The computer program of claim 14, wherein the set of instructions are further operable to:

generate, by the database system, a signature based on the identification information; and compare, by the database system, the signature to one or more trusted signatures to determine whether the function call is legitimate.

18. The computer program of claim 17, wherein the identification information comprises one or more values extracted from a memory stack associated with the function call.

19. The computer program of claim 17, wherein generating the signature comprises performing, by the database system, a hash operation on the identification information.

20. The computer program of claim 14 wherein the identification information comprises one or more cookies associated with the function, and wherein the set of instructions are further operable to:

generate, by the database system, a signature based on the one or more cookies; and compare, by the database system, the signature to one or more trusted signatures to determine whether the function call is legitimate.

* * * * *